United States Patent [19]
DeMarco

[11] Patent Number: 4,732,273
[45] Date of Patent: Mar. 22, 1988

[54] PROTECTIVE CONTAINER FOR CARAMEL APPLES

[76] Inventor: Daniel J. DeMarco, 7923 N. Kilbourn, Skokie, Ill. 60076

[21] Appl. No.: 56,815

[22] Filed: Jun. 2, 1987

[51] Int. Cl.$^4$ ............................................. B65D 85/34
[52] U.S. Cl. ................................. 206/470; 206/45.34; 229/2.5 R; 426/110
[58] Field of Search .......... 206/45.34, 315.9, 461–465, 206/467–471, 594; 229/2.5 R, 2.5 EC, 29 M; 426/106, 110

[56] References Cited

U.S. PATENT DOCUMENTS

| | | | |
|---|---|---|---|
| 3,122,441 | 2/1964 | Smith | 426/110 |
| 3,659,705 | 5/1972 | Falkin | 229/2.5 R |
| 3,695,514 | 10/1972 | Mascetti, Jr. | 229/2.5 R |
| 3,800,998 | 4/1974 | Gask | 229/2.5 R |
| 3,987,956 | 10/1976 | Congleton | 229/2.5 R |
| 4,001,440 | 1/1977 | Hoyt | 426/110 |
| 4,244,470 | 1/1981 | Burnham | 229/2.5 R |
| 4,494,650 | 1/1985 | Cullen | 206/315.9 |
| 4,512,474 | 4/1985 | Harding | 206/470 |

OTHER PUBLICATIONS

"The Egg Beater", *Packaging*, vol. 31, No. 1 Jan. 1986.

Primary Examiner—Jimmy G. Foster
Attorney, Agent, or Firm—Milton S. Gerstein; Marvin N. Benn

[57] ABSTRACT

A container for storing, transporting and displaying a caramel apple, or the like. The container is a single molded piece of plastic, with a pair of pivotal sections and a base section pivotally mounting the pair of pivotal sections. Each pivotal section is formed with an outwardly projecting half-shell, which half-shells cooperate when the two sections are in their closed abutting position, to form a substantially frustro-conically shaped hollow enclosure in which is stored the caramel apple. The base section is provided with an upstanding hollow support on the upper surface of which rests the caramel apple. Each pivotal section is also provided with a lowermost recess or cutout for nestling therein approximately half of the circumferential surface of the upstanding hollow support when the two pivotal sections are in their closed, abutting position. The base section also includes a pair of end wedge-members, each having a pair of oppositely-sloping surfaces, which sloping surfaces mate with similarly sloped surface sections extending from the lowermost edge surface of each pivotal section, in order to distribute and redirect load forces.

15 Claims, 7 Drawing Figures

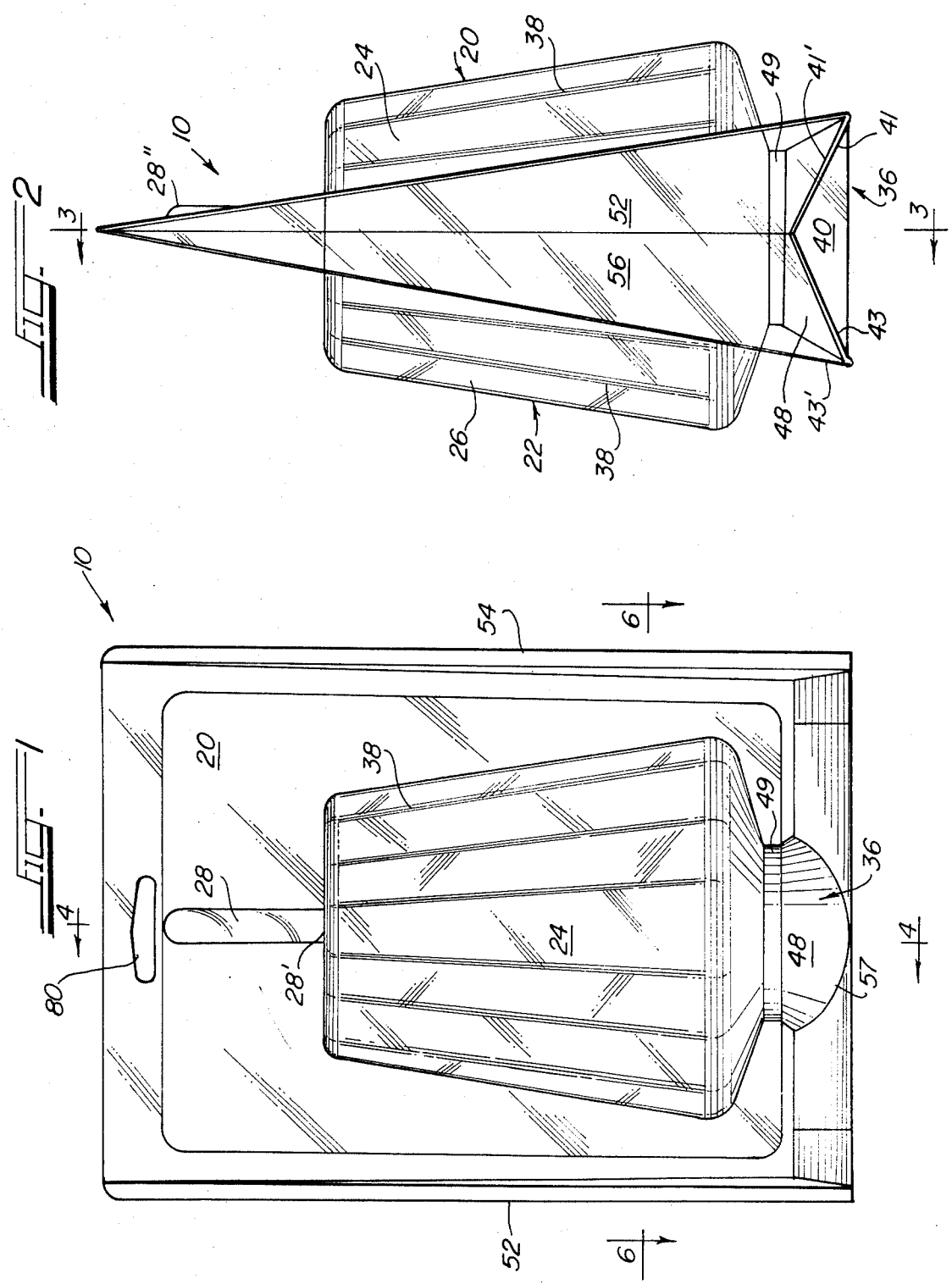

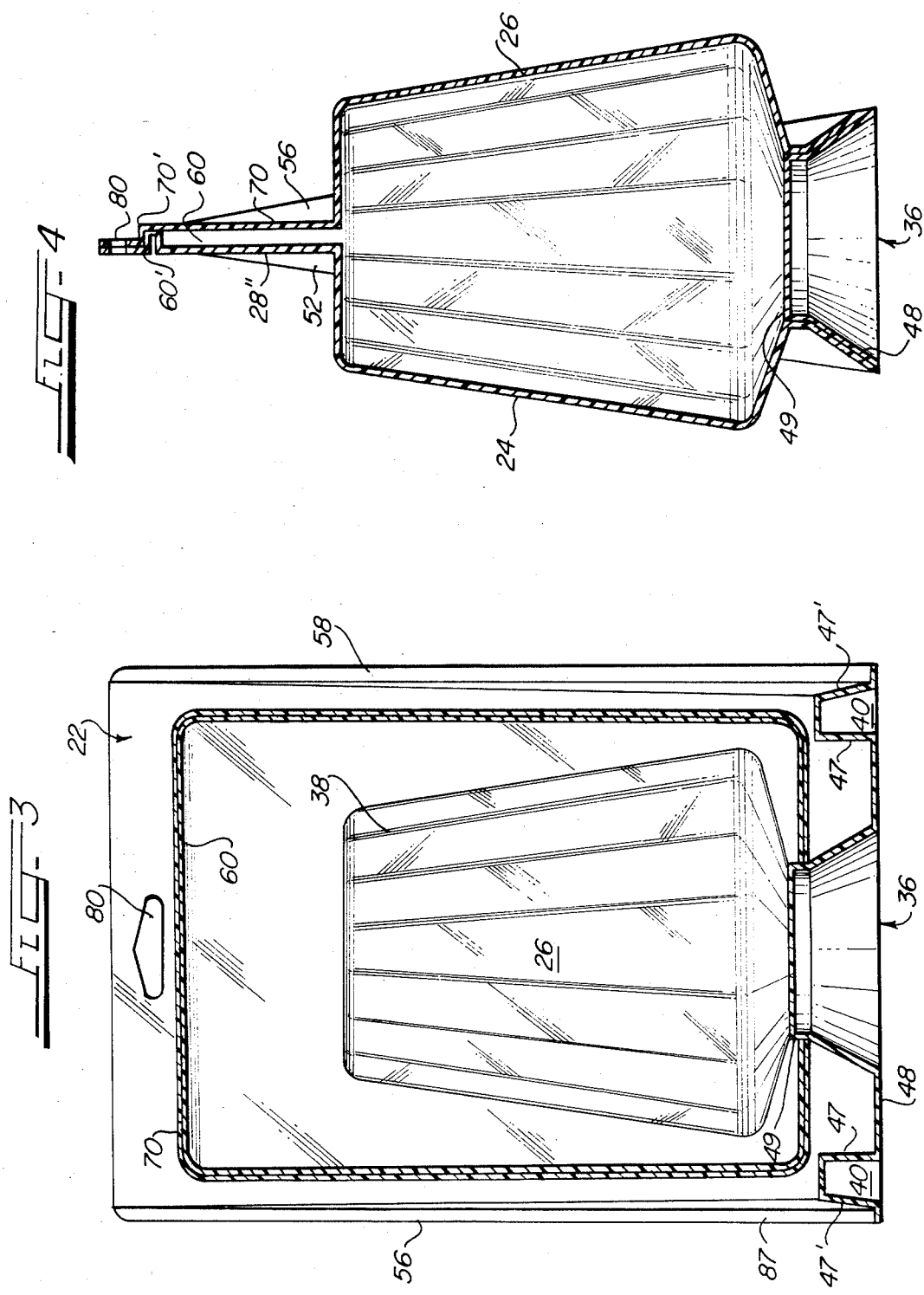

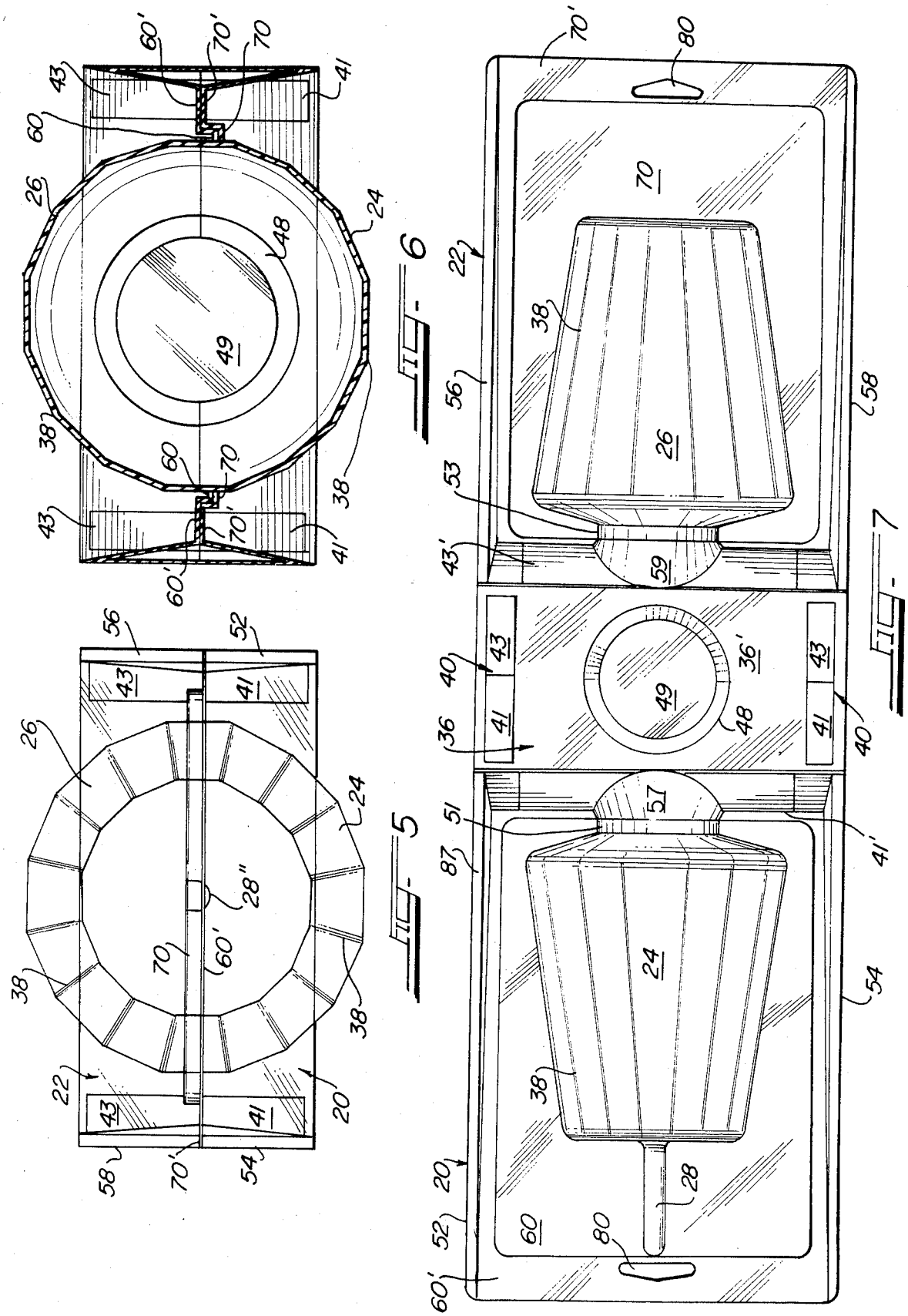

PROTECTIVE CONTAINER FOR CARAMEL APPLES

BACKGROUND OF THE INVENTION

The present invention relates generally to a wedge-like plastic molded container construction of improved utility for packaging and displaying candy-coated apples, such as caramel apples. The caramel apples are positioned individually within a rigid plastic molded container which provides a sanitary atmosphere and physically protects the caramel apple within the container. The invention provides a snap-fit closure for completely enclosing the caramel apple within the container, which container is easily opened and reclosed with light hand pressure after removal of all or a portion of its contents. The snap-fit closure means of the present invention will substantially improve product safety by providing tamper proof characteristics of the container, as compared to prior art methods of packaging and displaying caramel apples.

Caramel or candy-coated apples are commonly displayed in tray-style cartons, usually made of paperboard, which cannot be stacked individually. The caramel apples are usually arranged in rows within the tray, and covered by plastic wrapping material. In the process of opening the tray to remove one caramel apple, the remaining caramel apples are exposed to unsanitary conditions, public handling or tampering, and environmental contamination. The caramel apples are usually not individually wrapped or separated from each other and, even with the prior-art packaging method of placing the caramel apples in paper cup liners, the caramel apples can stick to adjacent caramel apples. This can result in the caramel coating being pulled away from adjacent caramel apples. Since only a partial view of each caramel apple is visible in this prior-art style container, a buyer is more likely to inspect several apples before making a final decision. Because it is not unusual for buyers to remove and inspect several caramel apples before finally picking one, this can result in the unsightly and unappetizing appearance of the remaining caramel apples. Besides the loss of visual appeal of the caramel apples in the tray-type container, freshness is lost each time the plastic wrap is removed for inspection by the purchaser. Another disadvantage to the prior art tray-type containers is that each tray cannot be stacked on top of another, since the carrying sticks of the caramel apples project above the level of the tray.

The present invention can readily and easily be displayed and stacked in pyramid style. The upper portion of the present invention's plastic molded container is provided with a die-cut slot to facilitate pegboard display for a plurality of containers. The containerized caramel apples of the present invention not only protect the product's freshness and visual appeal, but also allow the container to be stacked, in pyramid style, for display and resale.

SUMMARY OF THE INVENTION

It is, therefore, the main objective of the present invention to provide a plastic molded container for positioning therein an individual candy-coated or caramel apple in order to protect the caramel apple from damage during the packaging process, shipment, display and eventual resale of the caramel apple.

It is another objective of the present invention to provide such a container that will also provide a complete enclosure for the caramel apple and its carrying stick to facilitate a more sanitary atmosphere for the caramel apple, and retain its freshness longer.

It is still another objective of the present invention to provide a plastic molded container which can be opened and closed for removal of all or a portion of its contents.

It is yet another objective of the present invention to provide a plastic molded container that will facilitate the container being stacked, in pyramid fashion, for either display or resale.

It is still another objective of the present invention to provide a plastic molded container with a die-cut slot means for ease in displaying the caramel apple on pegboard-type display racks.

Toward these and other ends, the container of the invention is provided with a pair of pivotal sections hingedly connected to the edges of a base section. Each pivotal section has a multi-sided half-shell that forms a polygonally-shaped enclosure for a caramel apple when the two pivotal sections are in their closed position. Each pivotal section also has cooperating members for providing a snap fit to the closure of the container, which cooperating members are embodied by an inwardly-projecting flat surface from one pivotal section, and a hollow outwardly-projecting flat surface in the other pivotal section, which defines a recess for receiving in snap-fit fashion the inwardly-projecting flat surface of the one pivotal section. The base section has a flat surface portion from which, projecting upwardly, is a support member, on the upper surface of which may rest a caramel apple enclosed by the half-shells. The lower portion of each pivotal section is provided with appropriately provided and appropriately shaped cutouts for receiving therein circumferential surface areas of the support member when the pivotal sections are in their closed state. The base section also has a pair of wedge members, each wedge member having a pair of oppositely-sloped surfaces meeting at an apex, which sloped surfaces cooperate with a similarly sloped surface formed from the lowermost edge of each respective pivotal section. The wedge members distribute and redirect load forces in order to allow for a lighter weight and stronger container.

BRIEF DESCRIPTION OF THE DRAWINGS

The novel features and advantages of the present invention will be more readily understood with reference to the accompanying drawings, wherein:

FIG. 1 is a front-elevational view of the container according to the present invention;

FIG. 2 is a right side view of the closed container, showing the structural wedge-like shape of the preferred embodiment;

FIG. 3 is a sectional view of a closed container taken along line 3—3 of FIG. 2;

FIG. 4 is a side-sectional view of a closed container taken along line 4—4 of FIG. 1, depicting the container walls and base of a closed container;

FIG. 5 is a top view of the closed container of the invention;

FIG. 6 is a bottom end-sectional view of the closed container taken along line 6—6 of FIG. 1; and FIG. 7 shows a top plan view of the one-piece plastic container of the invention, depicting a single-piece of molded plastic film which is removed from the mold in an open, finished form.

DETAILED DESCRIPTION OF THE INVENTION

Referring now to the drawings in greater detail, the molded plastic container of the invention is indicated generally by reference numeral 10 in FIG. 1. In the preferred embodiment, the container 10 has a first pivotal section 20, a second pivotal section 22, and a base section 36, as indicated in FIGS. 1 and 2. As can be seen from FIG. 7, the molded container 10 is formed from a single sheet of plastic film, which is suitably molded to form the first section 20, the second section 22, and the base section 36. Respective sections 20 and 22 are substantially divided by a bisecting plane of the container 10. Hingedly attached to respective longitudinal edges of the base section 36 are the first section 20 and the second section 22, as clearly shown in FIG. 7. For purposes of description, the outward direction, with reference to each section 20, 22 in the closed state of the container 10, is that direction away from the other section 20, 22, while the inward direction is that direction toward the other of the sections 20, 22. The width, unless otherwise noted, is taken in a direction parallel to the short side of the container shown in FIG. 1.

The upright closed container, depicted in FIG. 4, illustrates the frustro-conically shaped enclosure for the caramel apple, formed when the first section 20 and the second section 22 come into positional alignment when the container is closed. This frustro-conically shaped enclosure is formed by respective half-shells 24 and 26, formed integrally with the respective sections 20 and 22, as clearly shown in FIG. 2.

Each half-shell 24 and 26 forms a polygonal-shaped enclosure so as to define a plurality of circumferentially-spaced stiffeners 38, molded integrally with the respective enclosure. These stiffeners 38 converge upwardly toward the apex at the top of the container, for the purpose of enhancing the structural integrity of the caramel apple container to better resist crushing and compression forces associated with the rough handling and transportation of the container. In the preferred embodiment, each half-shell 24 and 26 contains nine sides thereof, although it is to be understood that the number of sides provided depends upon the desired load absorption to be provided. The two half-shells 24 and 26 project outwardly from their respective sections 20 and 22 a desired distance, so as to contain therein even the largest of apples used in making caramel apples, and in order to allow for pyramiding a plurality of such containers 10, row upon row.

The first section 20 is provided with a vertically-extending linear groove 28, which receives therein the carrying stick of the caramel apple so that, when the two sections 20 and 22 are sandwiched together, the stick of the caramel apple will be received in the groove 28. The lowermost portion 28' of the groove 28 forms a spacial continuum with the interior of the enclosure 24, so that the caramel apple's stick may project upwardly from the apple contained in the frusto-conically shaped enclosure, and extend into the groove 28.

The base section 36 includes a generally flat surface portion 36' (FIG. 7) from the upper surface of which projects a centrally-disposed, frustro-conically shaped hollow support 48, which terminates in an upper, cylindrically-shaped hollow portion 49. The upper surface of portion 49 constitutes the resting support for the caramel apple placed within the container 10. Also projecting upwardly from the flat surface portion 36' is a pair of oppositely-disposed wedge members 40, as seen in FIG. 7. The wedge members 40 are used as a means by which access from the exterior of the container to the interior of the container is prevented, in order to provide a tamper-proof package. These wedge member 40 includes a pair of angularly-sloped surfaces 41 and 43 which define, along with the vertical side walls 47, 47' (FIG. 3) of the respective wedge member 40, a triangularly-shaped cross section, as clearly shown in FIG. 2. Each side wall 47' is preferably slightly inwardly-sloped, as shown in FIG. 3. Each of the sloped surfaces 41 and 43 of each of the wedge members 40 matingly cooperate with similarly sloped surfaces formed on the lower portions of the respective pivotal sections 20 and 22, to be described below in greater detail. These wedge members 40 also help to distribute and redirect the forces associated with stacking the full containers, in order to better withstand shipping and display stacking. The cooperating, mating sloped surfaces associated with each of the lower portions of the sections 20 and 22 are best seen in FIGS. 2 and 7, and are indicated generally by reference numerals 41' and 43'. Each sloped surface 41', 43' extends the entire lateral width of the respective pivotal sections 20, 22, and is only interrupted by cutouts 57, 59, described below in greater detail. The slope of the sloping surface of each of the surfaces 41' and 43' is the same as the slope of the surfaces 41 and 43 so that, when the sections 20 and 22 are pivoted to their closed position in order to contain a caramel apple therein, the surfaces 41' and 43' abut against, respectively, the sloped surfaces 41 and 43 of the wedge members 40. Each of the sloped surfaces 41' and 43', associated respectively with the sections 20 and 22, is provided with a centrally-disposed cutout, defined by crescent-shaped sloping recesses 57, 59, respectively, as can be seen in FIG. 7. Each recess 57, 59 slopes downwardly and outwardly and is generally concave in shape, so as to cooperatively mate with directly juxtapositioned portions of the frustro-conically shaped member 48, so that, when the pivotal sections 20, 22 are in their closed position to contain an apple therein, each of the crescent-shaped sloping recesses 57, 59 receives snugly therein coextensive portions of the frustro-conically shaped surface of the member 48. It is noted that each of the crescent-shaped recesses 57, 59 is unequal in width along the length thereof, which width is taken in a vertical direction when viewing FIG. 2. Specifically referring to FIG. 7, it may be seen that the central portion thereof, which lies along the central bisecting plane of the container, is wider with respect to the other portions thereof, in order to accommodate the reception therein of the associated, juxtapositioned lowermost portion of the frustro-conically shaped member 48, to ensure vertical orientation of the respective sections 20, 22 in their closed state depicted in FIG. 2A, as well as to provide additional cooperating wedge surfaces in order to bear and redistribute the forces. Also provided is a semicylindrical-shaped cutout 51 in the section 20, and a semicylindrical-shaped cutout 53 in the section 22, as best seen in FIG. 7. Each of these semicylindrical-shaped recesses 51 and 53 has a radius of curvature substantially equal to the radius of curvature of the cylindrical portion 49 of the base member 36 so that, when the sections 20 and 22 are pivoted to their closed caramel apple-containing position, each of the semicylindrical-shaped recesses 51 and 53 will receive therein half of the cylindrical portion 49. Each of the semicylindrical-shaped recesses 51 and 53 has a height, as taken in the vertical direction of the upstanding container, approximately equal to the height of the cylindrical member 49, so that the uppermost surface of the cylindrical member 49 cooperates with the interior of the frustro-conically shaped cavity of the container, to thereby support the caramel apple thereon. Cutouts 51 and 57, 53 and 59 are vertically contiguous.

Each section 20 and 22 is provided with a pair of oppositely-disposed, outwardly-projecting end flanges 52 and 54, 56 and 58, respectively, which are generally triangular in shape, the shorter, lower side thereof constituting the edge-most portion of the respective sloping surfaces 41' and 43'. These end flanges 52, 54, 56 and 58, in addition to providing aesthetic appearance, also allow for grasping each section 20 and 22 by the hand to thereby pivot the respective section relative to the base portion 36, in order to open and close the container and to store and remove the caramel apple. Each end flange also is provided with a beaded extension 87 projecting in the lateral direction, which lateral direction is parallel to the width of the container, from the the hypotenuse-side edge thereof of the respective end flange in order to aid in hand grasping the end-flanges for opening and closing the container.

When containing a caramel apple, the separate sections 20 and 22 are held in their closed, vertically-upright position by a snap fit provided by interengaging portions of the respective sections 20 and 22. That is, section 20 is provided with an inwardly projecting flat surface portion 60, which is generally rectangular in outline as seen in FIG. 7, and outwardly from which are formed the hollowed-out regions formed by the groove 28; the cavity formed by enclosure 24, and the hollowed-out regions formed by the semicylindrical cutout 51. This rectangularly-shaped, projecting flat surface 60 is best seen in FIG. 4. The other section 22 includes a substantially rectangularly-shaped, flat recessed surface 70, which portion 70 forms a recess for telescopingly receiving therein the projecting flat surface 60, to thereby provide a snap fit, it being understood that the substantially rectangularly-shaped surface 70 has length and width measurements only slightly larger than that of the projecting surface 60 to accommodate the snap fit therein. The snap fit provided is easily achieved, since the material from which the container is made is a substantially thin, flexible sheet of material such as polyethylene, polypropylene, etc. It is also noted that the recessed surface 70 of the section 22 is a completely flat surface for the regions above the respective cavity formed by the enclosure 26, so that the groove 28 formed in section 20 is sealed in the closed container position, to thereby prevent unwanted pivoting or movement of the stem and, therefore, the caramel apple itself when contained in the frustro-conically shaped enclosure of the container. Preferably, the groove 28 has a depth, in the outward direction, when viewing FIGS. 2 and 4, a distance such that the stick of the caramel apple will fit snugly therein, without any portion of the stick protruding from the groove to thereby be closed off by the upper flat surface of the recessed portion 70 of the section 22, to thereby provide a relatively nonmovable stick therein and concomitant greater stability of the caramel apple in the container 10. The groove 28 is formed by a substantially semicylindrical projection 28", as best seen in FIG. 2.

It is also noted that each of the wedge members 40 and the base member 36 are hollowed out, so as to provide lightness to the overall package without sacrificing structural integrity. That is, each wedge member 40 provides sloped surfaces 41 and 43, along with the pair of side surfaces thereof, the interior of which is hollowed-out; in like manner, the frustro-conically shaped projection 48 and associated cylindrically-shaped member 49 are also hollowed-out members such that, when viewing the overall container from the bottom thereof, as seen in FIG. 6, there is provided a hollowed-out area to ad lightness to the overall container. Also, the entire container of sections 20, 22 and base section 36 is made of clear plastic for viewing the caramel apple contained therein. Each of the semicylindrically-shaped cutouts 51 and 53 is situated at the lowermost central portion of the respective rectangularly-shaped surfaces 60 and 70. Furthermore, each of the respective rectangularly-shaped flat surfaces 60 and 70 is surrounded by another substantially rectangular flat surfaces 60' and 70', which flat surfaces 60' and 70' abut one another when the container is in its closed, upright position in the manner shown in FIG. 2, it being understood that the rectangularly-shaped flat surfaces 60' and 70' constituting that portion from which the sloping surfaces 41' and 43' outwardly extend, at the lower edges thereof, respectively. Furthermore, it is from the longitudinal side edge-surfaces of the rectangularly-shaped flat surfaces 60' and 70' that the triangularly-shaped end flanges 52, 54, 56 and 58 outwardly project. Each of the surrounding, rectangularly-shaped flat surfaces 60' and 70' is provided with a horizontally-disposed cutout 80 by which the container, when in its closed position, may be hung from a peg of a pegboard, or the like. It is clear, of course, that the inward projection of the rectangularly-shaped flat surface 60, from its surrounding, annular rectangularly-shaped surface 60', is the same as the outward projection of the flat rectangular-shaped surface 70, from the annular, rectangularly-shaped surface 70' of the section 22, so as to allow for the abutment of the annular surfaces 60' and 70' when the container is in its closed position.

While a specific embodiment of the invention has been shown and described, it is to be understood that numerous changes and modifications thereof may be made without departing from the scope, spirit and intent of the invention, as set out in the appended claims.

What is claimed is:

1. A container for shipping, storing and displaying a caramel apple, taffy apple, and the like, comprising:
   a base section having a substantially flat surface portion, said flat surface portion having a pair of oppositely-disposed longitudinal edges;
   a first pivotal section having a lower lateral edge-surface pivotally connected to one of said longitudinal edges of said flat surface portion of said base section;
   a second pivotal section having a lower lateral edge-surface pivotally connected to the other of said longitudinal edges of said flat surface portion of said base section;
   each of said first and second pivotal sections further comprises a lower canted flat section extending outwardly from the lower edge-surface of the respective planar surface area thereof;
   each of said first and second pivotal sections comprising a substantially planar surface area, and a half-shell portion projecting outwardly beyond said planar surface area, said half-shell portion defining a hollow interior in which may be stored part of a caramel apple, or the like;

said first and second pivotal sections being pivotal toward each other into abutting relationship in order to store a caramel apple therein, with the caramel apple being positioned within the enclosure formed by juxtapositioned said half-shells;

each of said first and second pivotal sections having cooperating means for removably interconnecting said first and second pivotal sections together to thereby hold said first and second pivotal sections together in a closed, upright state to thereby transport, store and display a caramel apple therein;

said base section further comprising an upwardly-extending centrally-disposed support member, said support member extending upwardly from the upper surface of said base section, each said canted surface section of each of said first and second pivotal sections comprising a centrally-disposed arcuate recess for receiving therein surface portions of said upstanding support member when said first and second pivotal sections are pivoted to their abutting, closed position.

2. The container according to claim 1, wherein said half-shells define a substantially frustro-conically shaped enclosure when said first and second pivotal sections are pivoted into their abutting, closed container position for storing a caramel apple therein; each said half-shell projecting outwardly from a respective said planar surface area of a respective said first and second pivotal sections.

3. The container according to claim 1, wherein one said planar surface area of one of said first and second pivotal sections comprises a vertically-extending groove defining a hollow interior therein, said hollow interior communicating with the hollow interior defined by the respective said half-shell of the respective said first and second pivotal sections, said groove being capable of receiving therein the stick of a caramel apple, or the like, when the caramel apple is contained within the cooperating said half-shells.

4. The container according to claim 3, wherein each said half-shell comprises a substantially polygonally-shaped enclosure having an arcuate extent of approximately 180 degrees with respect to said planar surface area of the respective said first and second pivotal sections.

5. The container according to claim 4, wherein said polygonally-shaped enclosure defines a plurality of upwardly extending and converging linear stiffeners to provide increased strength to the container.

6. The container according to claim 1, wherein said cooperating means of said first pivotal section comprises an inwardly-projecting flat surface portion formed in said planar surface area of said first pivotal section;

said cooperating means of said second pivotal section comprising an outwardly projecting flat surface portion;

each of said planar surface areas of said first and second pivotal sections defining an annular surface region about a respective said cooperating means, each said annular region of each of said first and second pivotal sections abutting against one another upon closure of said container, so that said inwardly-projecting flat surface portion of said first pivotal section may be telescopingly received within a similarly-shaped opening defined within said annular surface region of said second pivotal section by said outwardly-projecting flat surface portion thereof, to provide thereby a snap fit for the closure of the container, said outwardly-projecting flat surface portion being hollow to define said similarly-shaped opening.

7. The container according to claim 6, wherein said half-shell of said second pivotal section extends outwardly from said cooperating means of said second pivotal section.

8. The container according to claim 1, wherein said base section comprises a pair of oppositely-disposed wedge means extending upwardly from the upper surface of said flat surface portion thereof, each said wedge means comprising a pair of sloping surfaces meeting at an apex above the upper surface of said flat surface portion;

each of said first and second pivotal sections further comprising a lower, cooperating sloped-surface section extending the entire lateral width of the respective said first and second pivotal sections, for cooperating with the respective ones of said sloping surfaces of said oppositely-disposed wedge means, whereby forces are redistributed and redirected thereby.

9. The container according to claim 1, wherein said upstanding support member comprises a first, lower portion thereof that is substantially frustro-conical in shape, and a second, upper portion thereof that is substantially cylindrical in shape, the upper surface of said second portion constituting the support for an apple provided in said container.

10. The container according to claim 9, wherein each of said first and second pivotal sections further comprises a substantially semicylindrically-shaped recess formed in the lower portion thereof, each said semicylindrically-shaped recess receiving therein, when said first and second pivotal sections are in their closed apple-containing positions, approximately half of the circumferential surface of said upper cylindrically-shaped support.

11. The container according to claim 10, wherein each said arcuate recesses formed in a respective said canted surface section is substantially crescent shaped, having the greatest width thereof along a central bisecting plane of the respective said pivotal section, said plane being transverse to the width of the respective said pivotal section, said width of each said respective recess being narrower away from said central bisecting plane thereof to define said crescent shape, and to provide a sloped surface for cooperation with the sloped surface of the frustro-conically shaped portion of said upstanding support member; said width of each said crescent-shaped recess being taken vertically when said pivotal sections are in their closed, apple-containing positions.

12. The container according to claim 10 wherein said base section further comprises a pair of oppositely-disposed wedge-support members, each being substantially triangular in cross section, and comprising a first sloping surface and a second sloping surface, said first and second sloping surfaces meeting at an apex thereof, said first and second sloping surfaces sloping oppositely to each other;

said canted surface sections of said first pivotal section having approximately the same angle of slope as said first sloping surface of said wedge-support members, and said canted surface section of said second pivotal section having an angle of slope approximately the same as said second sloping surface of said wedge-support members, whereby, upon pivotal closing of the first and second pivotal sections, said canted surface sections of said pivotal sections cooperate with the sloping surfaces of said wedge-support members to thereby redistribute and redirect loading and carrying forces on the container.

13. The container according to claim 1, wherein each of said first and second pivotal sections comprises means formed therein for allowing mounting of said container on a peg of a pegboard, or the like.

14. The container according to claim 12, wherein each of said wedge-support members and said upstanding support member are hollowed-out members.

15. The container according to claim 12, wherein each of said first and second pivotal sections further comprises a pair of outwardly-extending, oppositely-disposed end flanges projecting from the longitudinal edges of the respective said planar surface area of a respective said first and second pivotal sections, each of said end flanges being used for grasping the container by hand to open and close said container.

* * * * *